United States Patent [19]

Dehring

[11] Patent Number: 4,562,774

[45] Date of Patent: Jan. 7, 1986

[54] MOTOR VEHICLE TURNTABLE

[75] Inventor: Alexander Dehring, Nowra, Australia

[73] Assignee: K. G. Coles & Co. Pty Limited, New South Wales, Australia

[21] Appl. No.: 561,232

[22] Filed: Dec. 14, 1983

[51] Int. Cl.$^4$ .............................................. B60S 13/02
[52] U.S. Cl. ........................................ 104/42; 104/44
[58] Field of Search ................. 104/44, 42, 40, 35, 104/36

[56] References Cited

U.S. PATENT DOCUMENTS

| 57,501 | 8/1866 | Hanson | 104/42 |
| 1,770,567 | 7/1930 | Bowen | 104/44 |
| 2,135,924 | 11/1938 | Toews | 104/44 X |
| 3,170,411 | 2/1965 | Howard | 104/44 X |
| 3,898,935 | 8/1975 | Norlie et al. | 104/44 X |

FOREIGN PATENT DOCUMENTS 1185253  3/1970  United Kingdom ............... 104/44

Primary Examiner—Harry Tanner
Attorney, Agent, or Firm—Oblon, Fisher, Spivak, McClelland & Maier

[57] ABSTRACT

A motor vehicle turntable (10) is operated by the weight distribution of the vehicle (13). The axis of rotation of the turntable is inclined relative to orthogonal phases, and the turntable is released for rotation and latched against rotation by means (16) actuated by the vehicle.

4 Claims, 5 Drawing Figures

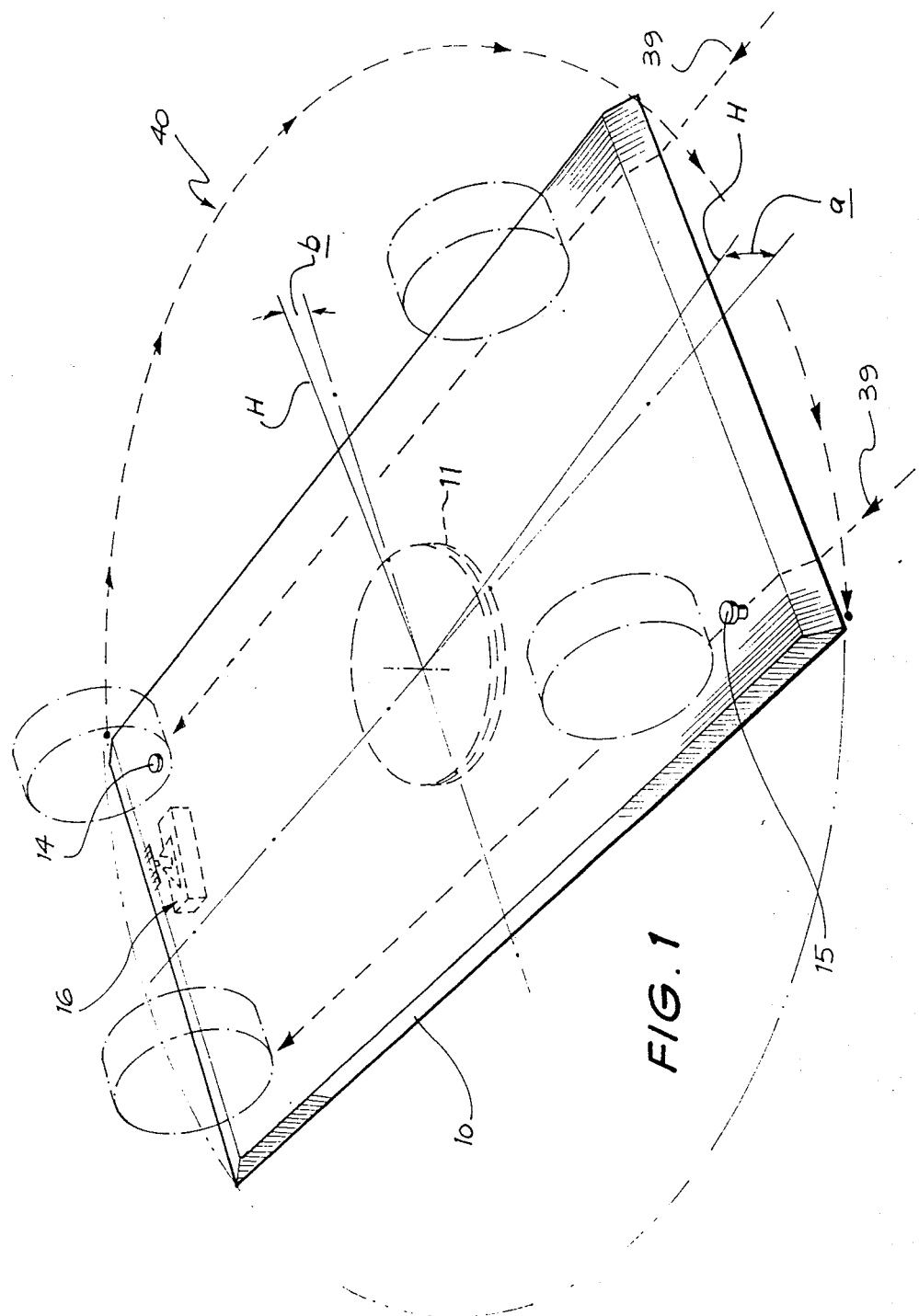

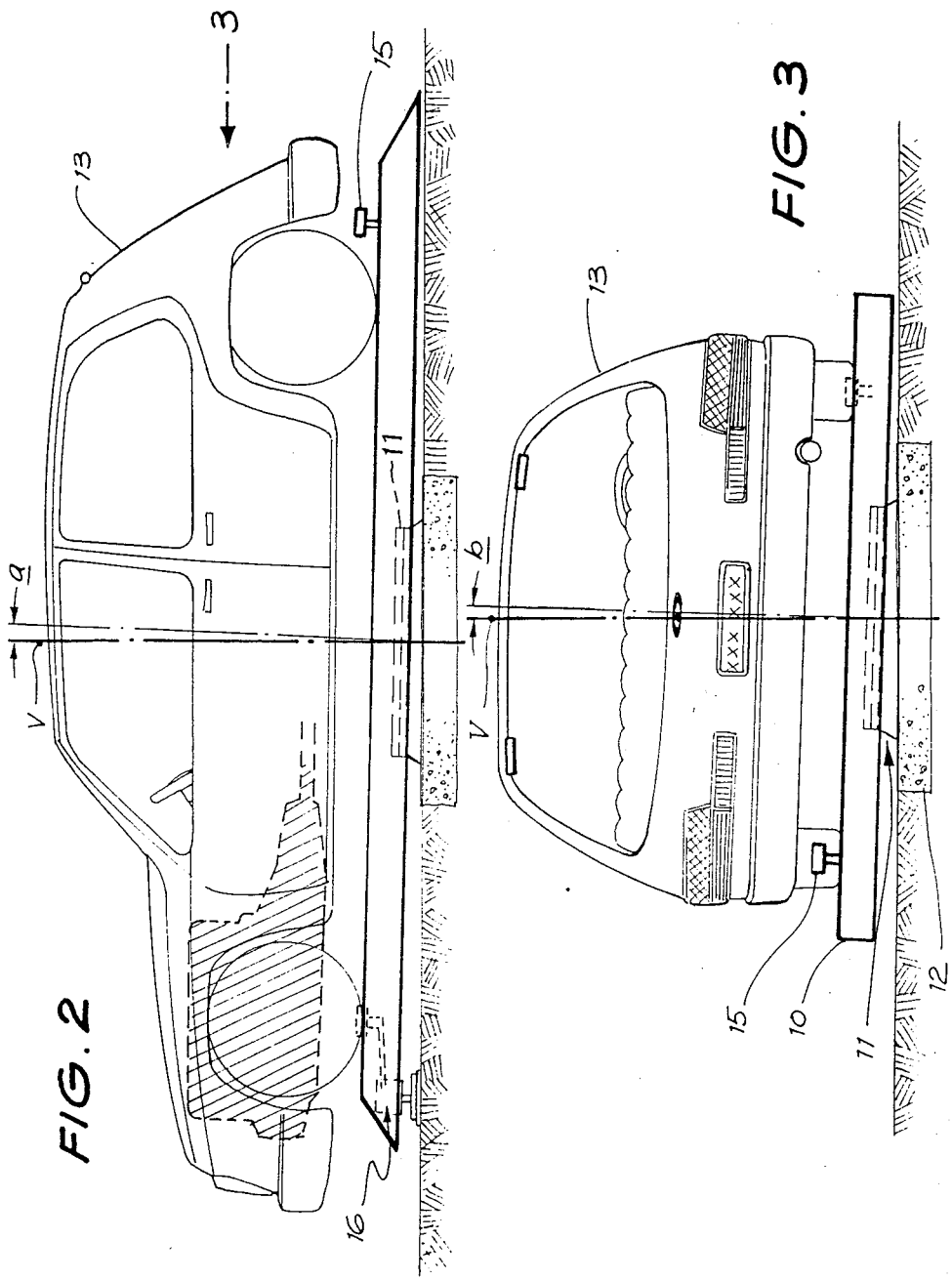

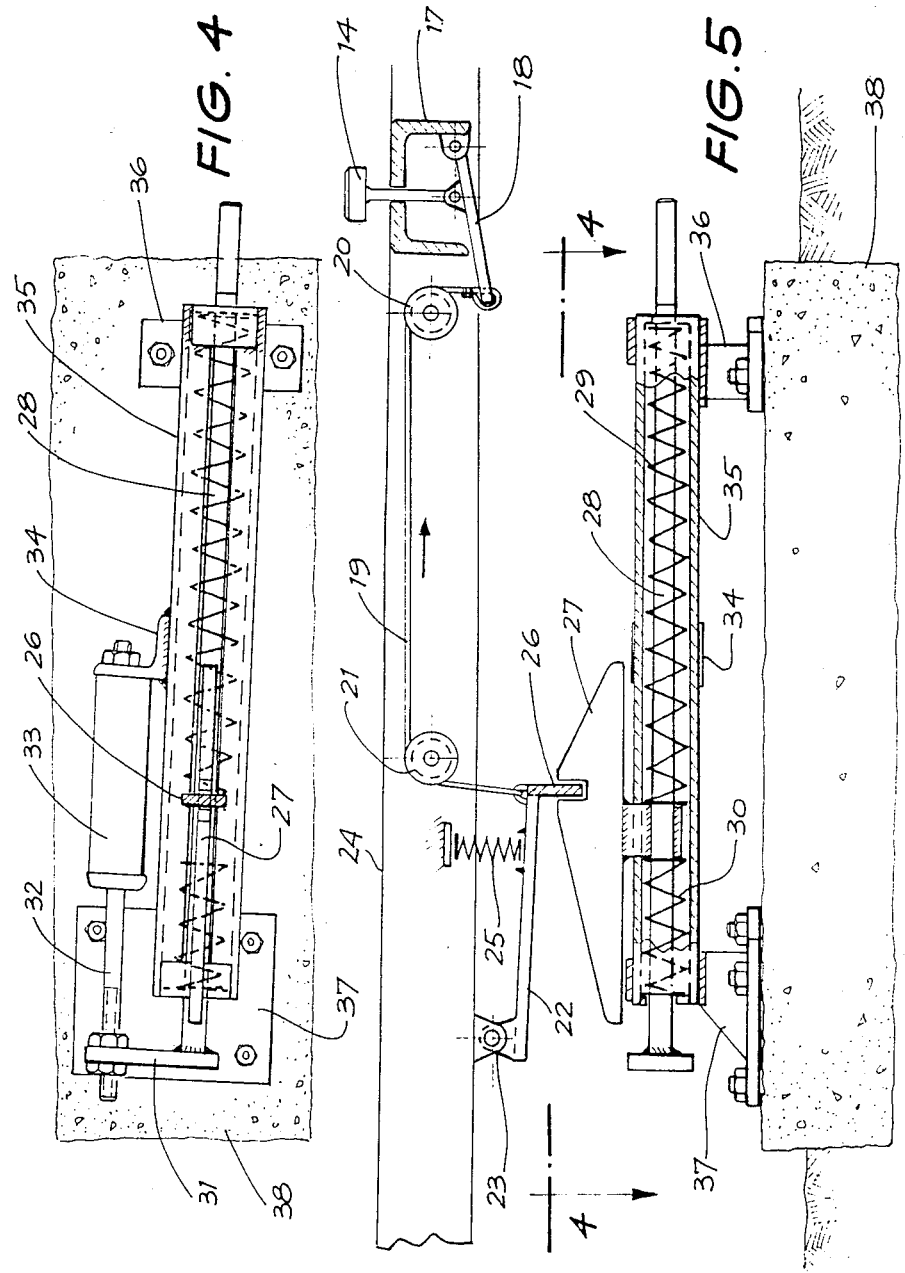

MOTOR VEHICLE TURNTABLE

This invention relates to turntables for motor vehicles, and has as its object the provision of a turntable which is suitable for domestic application to eliminate the necessity of reversing a vehicle out of a driveway.

Turntables manufactured in accordance with the present invention require no source of motive power other than the weight of the vehicle itself, due to the disposition of the axis of rotation of the turntable.

An embodiment of the present invention will be described, by way of example only, with reference to the accompanying drawings in which:

FIG. 1 is a schematic isometric view of a turntable embodying the present invention;

FIG. 2 is a side elevation of the turntable;

FIG. 3 is an end elevation of the turntable;

FIG. 4 is a plan view of an arresting mechanism for the turntable of FIGS. 1 to 3; and FIG. 5 is a partly sectioned elevation of the arresting mechanism.

The illustrated turntable 10, which may comprise sheets of non-skid surfaced steel and a supporting steel framework, is mounted for rotation on a bearing 11, which is preferably a double ball race bearing in which downward and horizontal loads are taken respectively by thrust and radial balls.

The bearing 11, shown only schematically here, is fixed to a concrete slab 12 set in the ground, in such a way that the axis of the bearing is not vertical, but is tilted from the vertical V by an angle a in the longitudinal direction of the turntable, and an angle b in the transverse direction of the turntable.

The turntable 10 thus slopes downwardly to the right as viewed in FIG. 2, and this facilitates the entry on to the turntable of a car 13 driven from a driveway (not shown). The turntable also slopes downwardly from left to right as seen in FIG. 3, at the angle b to the horizontal.

Two actuators 14 and 15 are located at diagonally opposite positions on the turntable 10. As illustrated in FIG. 5, the actuator 14 is attached to a lever 18 which pivots on a lateral frame member 17. Attached to the free end of the lever 18 is a cable 19, which passes around pulleys 20 and 21 and is attached to the free end of a further lever 22, pivoted at 23 on a longitudinal frame member 24. Depression of the actuator 14 will therefore cause the cable 19 to be drawn to the right as viewed in FIG. 5, lifting the end of the lever 22 against the action of a return spring shown schematically at 25.

Mounted on and extending downwardly from the end of the lever 22 is a detent blade 26, which in the locked and stationary position of the turntable as illustrated, is engaged within a slot in a catch plate 27.

The plate 27 is mounted on a rod 28 which extends through an elongated housing 35, the rod being located by its passage through apertures at each end of the housing 35. Between the plate 27 and the right-hand end of the housing 35 as viewed in FIG. 5 is a helical compression spring 29, and between the plate 27 and the left-hand end of the housing 35 is a further compression spring 30, while the piston 32 of a double acting hydraulic damper 33 is attached by means of a bracket 31 to the left-hand end of the rod 28. The damper 33 is mounted on the housing 35 by means of a bracket 34.

The turntable arresting assembly thus far described, is mounted by means of brackets 36 and 37 on a concrete slab 38, and located as schematically illustrated in FIGS. 1 and 2, where this assembly is shown at 16.

If a car is now driven on to the turntable to the position illustrated in FIGS. 2 and 3, there will be a tendency for the turntable to rotate in a clockwise direction as viewed in FIG. 1 (and as shown by the arrows 40) due to the fact that the portion of the car beyond and above the bearing 11 will exceed the weight of the portion of the car below the bearing, due to the location of the engine at the front of the car.

As the car reaches the position illustrated in FIGS. 2 and 3, its off-side front wheel will roll over the actuator 14, and the detent blade 26 will consequently be released from the plate 27. The turntable will now rotate through the path 40, and when this rotation has proceeded through 180°, the detent blade 26 associated with the actuator 15 will contact the catch plate 27, riding up the plate and entering the retaining slot. The inertia of the turntable and vehicle will cause the turntable to continue rotation against the action of the spring 29, and, upon recoil, against the spring 30, these movements being damped by the damper 33. The vehicle may then be driven off the turntable onto the driveway, and the turntable will be ready for its next operation.

It will be appreciated that while the turntable of the present invention has been described in relation to one embodiment only, it is capable of embodiment in many other forms. For example, it is not restricted to operation between positions spaced by 180°, but may, for example, be arranged to move through 90° to facilitate manoeuvering the vehicle in a restricted space. Other possible variations will be apparent to those skilled in the art.

The claims defining the invention are as follows:

I claim:

1. A turntable comprising:
   (a) a generally planar rectangular support having:
      (i) a first corner, a second corner, a third corner, and a fourth corner;
      (ii) a first short side connecting said first corner and said second corner, a first long side connecting said second corner and said third corner, a second short side connecting said third corner and said fourth corner, and a second long side connecting said fourth corner and said first corner; and
      (iii) a longitudinal axis perpendicular to and bisecting said first and second short sides and a transverse axis perpendicular to and bisecting said first and second long sides;
   (b) a bearing supporting said support at the intersection of said longitudinal and transverse axes, said bearing supporting said support for rotation about an axis which is inclined from the vertical by an angle a in the longitudinal direction and an angle b in the transverse direction; and
   (c) detent means for releasably holding said support in either a first position in which said first corner is tilted upwardly and said third corner is tilted downwardly about a diametric line connecting said second and fourth corners or a second position in which said first corner is tilted downwardly and said third corner is tilted upwardly about the diameteric line connecting said second and fourth corners, said detent means comprising first and second latch means located at diagonally opposite positions on said support in position to be released by contact with a wheel of a vehicle driven onto said support, whereby, when a vehicle is driven onto said support such that the center of gravity of the vehicle is located between the inclined axis of said bearing and said first short side and one of said first and second latch means is released, said support will rotate by 180° under the influence of the force of gravity, changing the direction of the vehicle.

2. A turntable as recited in claim 1 wherein each of said first and second latch means is automatically engaged after said support has rotated 180° after release of the other one of said first and second latch means.

3. A turntable comprising:
 (a) a generally planar horizontal support for receiving a motor vehicle thereon from a given direction, said given direction defining a longitudinal axis on said support, a transverse axis on said support being defined by a line thereon perpendicular to said longitudinal axis, said longitudinal and transverse axes defining first, second, third, and fourth quadrants on said support;
 (b) a bearing supporting said support at the intersection of said longitudinal and transverse axes, said bearing supporting said support for rotation about an axis which is inclined from the vertical by an angle a in the longitudinal direction and an angle b in the transverse direction; and
 (c) detent means for releasably holding said support in either a first position in which said first quadrant is tilted upwardly and said third quadrant is tilted downwardly about a line connecting said second and fourth quadrants or a second position in which said first quadrant is tilted downwardly and said third quadrant is tilted upwardly about said line, said detent means comprising first and second latch means located at diagonally opposite positions on said support in position to be released by contact with a wheel of a vehicle driven onto said support, whereby, when a vehicle is driven onto said support such that the center of gravity of the vehicle is located in said first or second quadrants and one of said first and second latch means is released, said support will rotate 180° under the influence of the force of gravity, changing the direction of the vehicle.

4. A turntable as recited in claim 3 wherein each of said first and second latch means is automatically engaged after said support has rotated 180° after release of the other one of said first and second latch means.

* * * * *